US009819592B2

(12) United States Patent
Meredith et al.

(10) Patent No.: US 9,819,592 B2
(45) Date of Patent: Nov. 14, 2017

(54) APPARATUS AND METHOD FOR AUTOMATIC RECONCILIATION OF DATA THROUGHPUT

(71) Applicants: AT&T INTELLECTUAL PROPERTY I, L.P., Atlanta, GA (US); AT&T Mobility II LLC, Atlanta, GA (US)

(72) Inventors: Sheldon K. Meredith, Roswell, GA (US); William Cottrill, Canton, GA (US); Sankat Chauhan, Alpharetta, GA (US)

(73) Assignees: AT&T INTELLECTUAL PROPERTY I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 99 days.

(21) Appl. No.: 15/019,301

(22) Filed: Feb. 9, 2016

(65) Prior Publication Data
US 2017/0230293 A1 Aug. 10, 2017

(51) Int. Cl.
*H04L 12/801* (2013.01)
*H04L 12/26* (2006.01)

(52) U.S. Cl.
CPC .......... *H04L 47/12* (2013.01); *H04L 43/0888* (2013.01)

(58) Field of Classification Search
CPC ............................ H04L 47/12; H04L 43/0888
See application file for complete search history.

(56) References Cited

U.S. PATENT DOCUMENTS 6,459,682 B1 10/2002 Ellesson et al.
7,424,526 B1 9/2008 Hansen et al.
(Continued)

FOREIGN PATENT DOCUMENTS

| EP | 2403188 | 1/2012 |
|----|---------|--------|
| EP | 2482494 | 8/2012 |
| WO | 0161523 | 8/2001 |

OTHER PUBLICATIONS

Manageengine,"Billing Using NetFlow—measure bandwidth usage in your enterprise network!," NetFlow Analyzer, manageengine. com, Aug. 20, 2009. https://web.archive.org/web/20090820004618/ http://www.manageengine.com/products/netflow/usage-based-billing.htm.
(Continued)

*Primary Examiner* — Duc C Ho
(74) *Attorney, Agent, or Firm* — Akerman LLP; Michael K. Dixon; Mammen (Roy) P. Zachariah, Jr.

(57) ABSTRACT

A system for automatic reconciliation of data throughput is disclosed. In particular, the system may include automatically and repetitively measuring the available upload and download throughput that a user of an internet service provider statistically receives through the course of a selected period of time. The system jointly monitors the user's data usage volume over time and automatically determines if the user is subscribing for throughput that the user is not receiving at the times that the user is using his or her subscribed service. If the system determines that the user is subscribing for throughput that the user is not receiving, the system may perform a variety of corrective actions. Such corrective actions may include reducing the subscribed for throughput, transmitting a notification to the user to modify the subscribed service, or increasing the subscribed for
(Continued)

throughput to improve the user's experience with the internet service provider.

20 Claims, 4 Drawing Sheets

(56) References Cited

U.S. PATENT DOCUMENTS

| | | |
|---|---|---|
| 7,496,653 B2 | 2/2009 | Bournas |
| 7,660,261 B2 | 2/2010 | Keromytis et al. |
| 8,086,219 B2 | 12/2011 | O'neil et al. |
| 8,208,395 B2 | 6/2012 | Kotrla et al. |
| 8,284,692 B2 | 10/2012 | Arye |
| 8,606,911 B2 | 12/2013 | Raleigh et al. |
| 8,630,193 B2 | 1/2014 | Bugenhagen |
| 8,706,863 B2 | 4/2014 | Fadell |
| 8,797,867 B1 | 8/2014 | Chen et al. |
| 8,830,833 B2 | 9/2014 | Bugenhagen |
| 8,893,009 B2 | 11/2014 | Raleigh et al. |
| 9,003,022 B2 | 4/2015 | Hong et al. |
| 9,197,572 B2 | 11/2015 | Garcia-luna-aceves et al. |
| 2002/0039352 A1 | 4/2002 | El-fekih et al. |
| 2004/0102182 A1 | 5/2004 | Reith et al. |
| 2005/0068891 A1 | 3/2005 | Arsikere et al. |
| 2008/0049639 A1 | 2/2008 | Wiley et al. |
| 2012/0011265 A1* | 1/2012 | Curcio .............. H04N 21/2402 709/231 |
| 2012/0155296 A1 | 6/2012 | Kashanian |
| 2013/0250800 A1 | 9/2013 | Barker |
| 2013/0272159 A1 | 10/2013 | Pang et al. |
| 2014/0064120 A1* | 3/2014 | Sethuraman .......... H04W 24/02 370/252 |
| 2015/0341211 A1* | 11/2015 | Saha .................... G05B 13/048 709/221 |

OTHER PUBLICATIONS

Paessler AG, "Bandwidth Monitoring Using PRTG Network Monitor," paessler.com, May 13, 2008. https://web.archive.org/web/20080513213302/http://www.paesslercom/bandwidth_monitoring.

Buckeye, "Buckeye Express High-Speed Internet Consumption Plan: Frequently Asked Questions (FAQs)," buckeyecablesystem.com, Apr. 2, 2014. https://web.archive.org/web/20140402165319/http://buckeyecablesystem.com/downloads/BEX_docs/ConsumptionFAQs.pdf.

* cited by examiner

APPARATUS AND METHOD FOR AUTOMATIC RECONCILIATION OF DATA THROUGHPUT

FIELD OF THE INVENTION

The present application relates to network communication technologies, data throughput measurement technologies, monitoring technologies, and mobile device technologies, and more particularly, to a system, apparatus, and method for automatic reconciliation of data throughput.

BACKGROUND

In today's technology-driven society, users regularly utilize various types of devices to communicate with each other and to communicate with various computer systems. For example, users utilize smartphones, tablets, phablets, computers, mobile devices, and other technologies to make telephone calls, access various types of internet services, access content and information, perform a variety of tasks and functions, or a combination thereof. In order to connect to the various devices and systems that facilitate such tasks and functions, users typically subscribe to internet service plans from service providers to obtain varying levels of peak throughput. Typically, the higher the peak throughput desired by the user, the higher the cost. Based on the peak throughput subscribed to, the users may download or upload data and information from various connected entities. For example, a user subscribing to a 25 Mbps internet service plan will typically be able to download or upload content and information much faster than a user subscribed to a 10 Mbps internet service plan.

While current network connectivity technologies provide many benefits, there is still room for substantial improvement. For example, although service providers often make a best effort to provide the optimal throughput paid for by subscribers, the practical realities of signal-to-noise ratios, instantaneous network loading and path latencies may hinder the service provider's ability to do so. Additionally, a service provider may inadvertently bill a user for their chosen maximum throughput option even though the user may not be able to achieve the paid-for throughput. For example, a user may live in a community where there is massive congestion during prime time, and the user may only use their internet connection during prime time. Such a user may never achieve his or her paid-for throughput if they only use their internet connection during prime time. Instead, the user may have a throttled internet connection that only allows for much lower throughput. While the same user may be able to achieve the paid-for throughput at early morning hours, the user may never end up using their internet connection at such times. As a result, current network technologies may be enhanced so as to provide improved efficiencies, provide improved functionality and features, provide greater service to users, and to provide substantial cost savings to users.

SUMMARY

A system, an apparatus, and accompanying methods for automatic reconciliation of data throughput are disclosed. In particular, the system, apparatus, and methods may automatically and repetitively measure the available upload and download throughput that a subscriber of an internet service provider is statistically receiving during a given period of time. The system, apparatus, and method jointly monitor the subscriber's data usage volume over time, automatically determine if the subscriber is subscribing for throughput that the subscriber is not actually receiving (i.e. at the times the subscriber is using his service), and take corrective actions accordingly. By doing so, the system, apparatus, and methods may assist in reducing the subscriber's subscribed throughput to prevent overbilling, providing options to subscribers to increase their subscribed throughput, and/or improving the subscribers' experiences with the service provider. In order to accomplish the foregoing, the system, apparatus, and methods may include incorporating a throughput measurement capability as close to the subscriber's devices as possible, and to have the throughput measurement capability automatically and periodically communicate with the service provider's remote servers to collect throughput statistics and compare them to records (e.g. billing records) for that particular subscriber. This may be achieved by installing software (e.g. a testing application) including such capability at a router in proximity to the subscriber's devices. Notably, the software may have its own dedicated internet protocol address that is not subject to throttling by the service provider or otherwise.

Once installed, the software may transmit packet data of varying file sizes to the remote servers of the service provider, which may measure the transmission time and determine the maximum throughput available for the network connections and/or communications links that are utilized to provide internet connectivity for the subscriber. This process may also occur in the opposite direction and similar software may be installed at the service provider's premises. The software installed at the service provider's premises may transmit packet data of varying file sizes to the software installed on the router, which may measure the transmission time and determine the maximum throughput in that direction of data flow. In certain embodiments, the throughput measurements may occur frequently and periodically, such as every hour on the hour. In parallel to the throughput measurements made by the software installed at the router and service provider premises, the system, apparatus, and method may include measuring the total payload of data received and/or transmitted from the subscriber's account for all internet protocol addresses under subscriber's internet service plan, except for the internet protocol address reserved for the testing software installed at the router or other testing software. In certain embodiments, this tonnage of data may be accumulated at designated time intervals, such as hourly.

At the remote servers of the service provider, the system, apparatus, and method may include determining, over a timeline of interest, what percentage of a subscriber's total usage occurs per hour of the day. The system, apparatus, and method may then include calculating a weighted average of throughput, which may be the measured throughput per hour weighted by the historical percentage of customer data usage per hour. The weighted average of throughput may then be compared to the subscriber's subscription information (e.g. found in billing records) to determine if the weighted average of throughput is within a parametric percentage of the subscribed-for (i.e. billed) throughput. The system, apparatus, and method may also be utilized to determine if the measured throughput ever gets to up to the billed throughput. If the weighted average of throughput differs from the amount of throughput subscribed to by the user by greater than a threshold percentage, the system, apparatus, and method may include performing a corrective action. For example, the subscriber may be contacted via notification to inform the subscriber that they are paying for a throughput option that is not being achieved and that the subscriber may consider backing down from their current internet service plan to a lower throughput internet service plan. In the alternative, if the weighted average of throughput is higher than the throughput the subscriber has subscribed to, the system, apparatus, and method may include providing an option to the subscriber to move to a higher throughput internet service plan than what the subscriber currently has. In certain embodiments, even if the weighted average of throughput is sufficiently close to the subscribed-to throughput, but is nevertheless less than the subscribed-to throughput, the subscriber may be notified that the subscriber is within x % of the billed throughput, but not actually getting the billed throughput.

Notably, the system, apparatus, and method allows for independent throughput measurement through the use of testing applications that have their own dedicated internet protocol addresses that are not throttled by the service provider. By doing so, this allows the system, apparatus, and method to make a maximum throughput determination even when the subscriber's data connection is already being throttled. The remote servers of the service provider may connect with billing systems and data usage systems to facilitate the functionality provided in the present disclosure. It is not as simple as just measuring throughput and comparing it to a peak level. The billing systems contain what the peak throughputs are for the service plans and the data usage systems allow for the determination of the weights throughout a period of time in order to compute the weighted average calculations. The subscriber's user profiles may also contain similar information as billing records and may also be utilized by the system, apparatus, and method to provide the functionality as provided in the present disclosure. Based on the functionality provided according to the present disclosure, the system, apparatus, and methods may provide for improved user experiences with service providers, improved service provider accountability, improved savings, and other benefits.

In one embodiment, a system for automatic reconciliation of data throughput is disclosed. The system may include a memory that stores instructions and a processor that executes the instructions to perform various operations of the system. The system may perform an operation that includes receiving, at a remote server and from an application installed on a router in proximity to a device of a user, first packet data including first files of varying file sizes. The system may then perform an operation that includes determining, at the remote server, a maximum throughput of a network connection of the user. The maximum throughput may be determined based on a first transmission time associated with receiving the first packet data. Additionally, the system may perform an operation that includes determining, for all internet protocol addresses associated with the user that utilize the network connection, a total payload of data transmitted or received using the network connection during a selected period of time. The total payload of data may indicate the total usage of the network connection by the user. The system may proceed to perform an operation that includes determining a percentage of the total usage of the network connection that occurs per hour of the selected period of time. Then, the system may perform an operation that includes computing a weighted average of throughput for the network connection of the user. The weighted average of throughput may be computed based on the maximum throughput per hour for the network connection weighted by the percentage of the total usage of the network connection that occurs per hour. Furthermore, the system may perform an operation that includes comparing the weighted average of throughput for the network connection of the user to an amount of throughput subscribed to by the user. Moreover, the system may perform an operation that includes generating a first notification if the weighted average of throughput differs from the amount of throughput subscribed to by the user by greater than a threshold percentage.

In another embodiment, a method for automatic reconciliation of data throughput is disclosed. The method may include utilizing a memory that stores instructions, and a processor that executes the instructions to perform the various functions of the method. The method may include receiving, at a remote server and from an application installed on a router in proximity to a device of a user, first packet data including first files of varying file sizes. The method may also include determining, at the remote server, a maximum throughput of a network connection of the user. The maximum throughput may be determined based on a first transmission time associated with receiving the first packet data. The method may then include determining, for all internet protocol addresses associated with the user that utilize the network connection, a total payload of data transmitted or received using the network connection during a selected period of time. The total payload of data may indicate a total usage of the network connection by the user. The method may then include determining a percentage of the total usage of the network connection that occurs per hour of the selected period of time. Additionally, the method may include computing a weighted average of throughput for the network connection of the user. The weighted average of throughput may be computed based on the maximum throughput per hour for the network connection weighted by the percentage of the total usage of the network connection that occurs per hour. Furthermore, the method may include comparing the weighted average of throughput for the network connection of the user to an amount of throughput subscribed to by the user. Moreover, the method may include transmitting a first notification if the weighted average of throughput differs from the amount of throughput subscribed to by the user by greater than a threshold percentage.

According to yet another embodiment, a computer-readable device having instructions for automatic reconciliation of data throughput is provided. The computer instructions, which when loaded and executed by a processor, may cause the processor to perform operations including: receiving, at a remote server and from an application installed on a router in proximity to a device of a user, first packet data including first files of varying file sizes; determining, at the remote server, a maximum throughput of a network connection of the user, wherein the maximum throughput is determined based on a first transmission time associated with receiving the first packet data; determining, for all internet protocol addresses associated with the user that utilize the network connection, a total payload of data transmitted or received using the network connection during a selected period of time, wherein the total payload of data indicates a total usage of the network connection by the user; determining a percentage of the total usage of the network connection that occurs per hour of the selected period of time; computing a weighted average of throughput for the network connection of the user, wherein the weighted average of throughput is computed based on the maximum throughput per hour for the network connection weighted by the percentage of the total usage of the network connection that occurs per hour; comparing the weighted average of throughput for the network connection of the user to an amount of throughput subscribed to by the user; and generating a first notification if the weighted average of throughput differs from the amount of throughput subscribed to by the user by greater than a threshold percentage.

These and other features of the systems, apparatuses, and methods for automatic reconciliation of data throughput are described in the following detailed description, drawings, and appended claims.

DETAILED DESCRIPTION OF THE INVENTION

Figure 1:
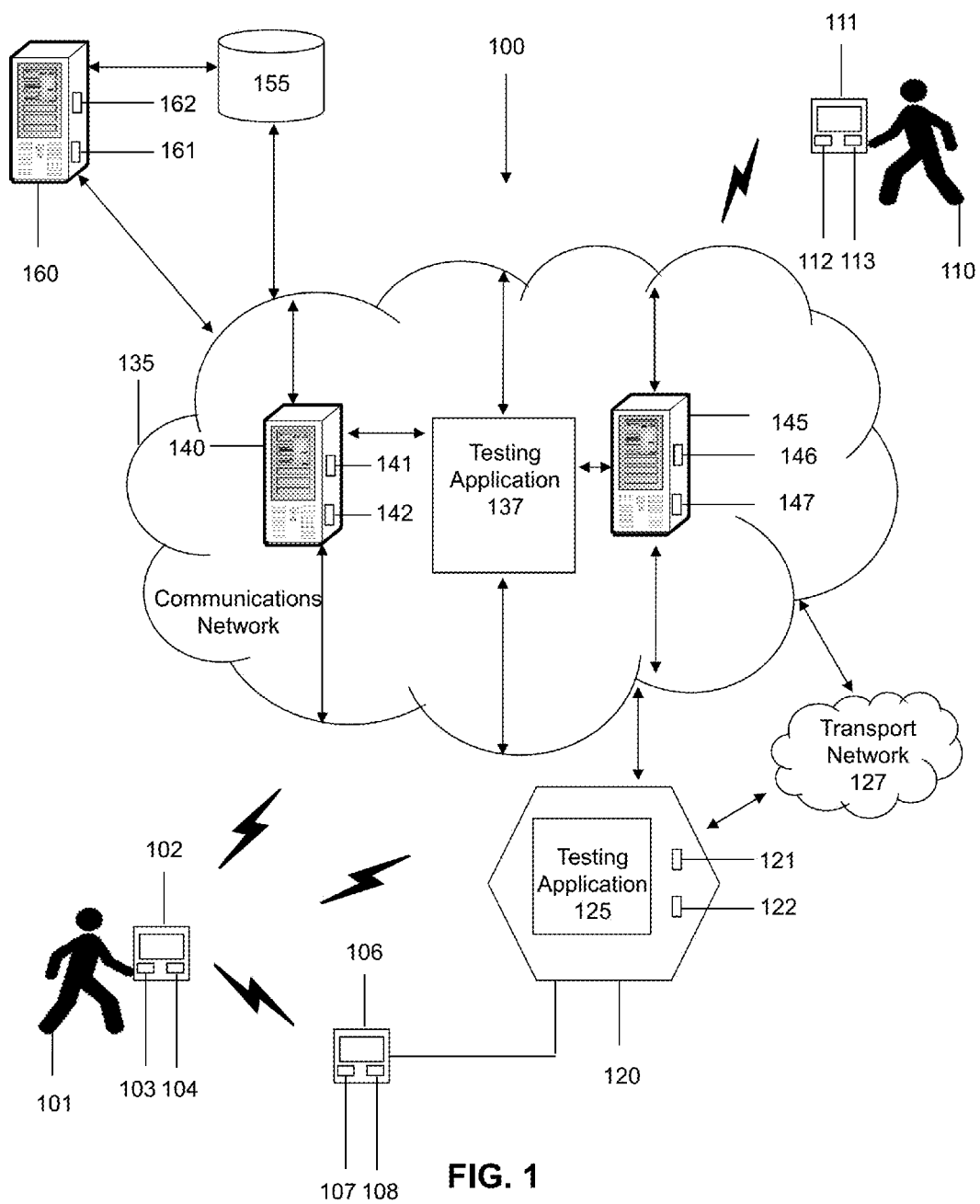
FIG. 1 is a schematic diagram of a system and apparatus for automatic reconciliation of data throughput according to an embodiment of the present disclosure.

A system 100, an apparatus 200, and accompanying methods for automatic reconciliation of data throughput are disclosed. In particular, the system 100, apparatus 200, and methods may automatically and repetitively measure the available upload and download throughput that a subscriber (e.g. first and/or second user 101, 110) of an internet service provider is statistically receiving during a given period of time. The system 100, apparatus 200, and method jointly monitor the subscriber's data usage volume over time, automatically determine if the subscriber is subscribing for throughput that the subscriber is not actually receiving (i.e. at the times that the subscriber is using his service), and take corrective actions accordingly. By doing so, the system 100, apparatus 200, and methods may assist in reducing the subscriber's subscribed throughput to prevent overbilling, providing options to subscribers to increase their subscribed throughput, and/or improving the subscribers' experiences with the service provider. In order to accomplish the foregoing, the system 100, apparatus 200, and methods may include incorporating a throughput measurement capability (e.g. testing application 125) as close to the subscriber's devices as possible, and to have the throughput measurement capability automatically and periodically communicate with the service provider's remote servers (e.g. servers 140, 145) to collect throughput statistics and compare them to records (e.g. billing records) for that particular subscriber. This may be achieved by installing software (e.g. testing application 125) including such capability at a router 120 in proximity to the subscriber's devices (e.g. first user device 102). Notably, the software may have its own dedicated internet protocol address that is not subject to throttling by the service provider or otherwise.

Once installed, the software may transmit packet data of varying file sizes to the remote servers of the service provider, which may measure the transmission time and determine the maximum throughput available for the network connections and/or communications links that are utilized to provide internet connectivity for the subscriber. This process may also occur in the opposite direction and similar software may be installed at the internet service provider's premises 136. The software installed at the internet service provider's premises 136 may transmit packet data of varying file sizes to the software installed on the router 120, which may measure the transmission time and determine the maximum throughput in that direction of data flow. In certain embodiments, the throughput measurements may occur frequently and periodically, such as every hour on the hour. In parallel to the throughput measurements made by the software installed at the router 120 and internet service provider premises 136, the system 100, apparatus 200, and method may include measuring the total payload of data received and/or transmitted from the subscriber's account for all internet protocol addresses under subscriber's internet service plan, except for the internet protocol address reserved for the testing software installed at the router 120. In certain embodiments, this tonnage of data may be accumulated at designated time intervals, such as hourly.

At the remote servers of the service provider, the system 100, apparatus 200, and method may include determining, over a timeline of interest, what percentage of a subscriber's total usage occurs per hour of the day. The system 100, apparatus 200, and method may then include calculating a weighted average of throughput, which may be the measured throughput per hour weighted by the historical percentage of customer data usage per hour. The weighted average of throughput may then be compared to the subscriber's subscription information (e.g. found in billing records) to determine if the weighted average of throughput is within a parametric percentage of the subscribed-for (i.e. billed) throughput. The system 100, apparatus 200, and method may also be utilized to determine if the measured throughput ever gets to up to the billed throughput. If the weighted average of throughput differs from the amount of throughput subscribed to by the user by greater than a threshold percentage, the system 100, apparatus 200, and method may include performing one or more corrective actions. For example, the subscriber may be contacted via notification to inform the subscriber that they are paying for a throughput option that is not being achieved and that the subscriber may consider backing down from their current internet service plan to a lower throughput internet service plan. In the alternative, if the weighted average of throughput is higher than the throughput the subscriber has subscribed to, the system 100, apparatus 200, and method may include providing an option to the subscriber to move to a higher throughput internet service plan than what the subscriber currently has. In certain embodiments, even if the weighted average of throughput is sufficiently close to the subscribed-to throughput, but is nevertheless less than the subscribed-to throughput, the subscriber may be notified that the subscriber is within x % of the billed throughput, but not actually getting the billed throughput.

Notably, the system 100, apparatus 200, and method allows for independent throughput measurement through the use of testing applications that have their own dedicated internet protocol addresses that are not throttled by the service provider. By doing so, this allows the system 100, apparatus 200, and method to make a maximum throughput determination even when the subscriber's data connection is already being throttled. The remote servers of the service provider may connect with billing systems and data usage systems to facilitate the functionality provided in the present disclosure. It is not as simple as just measuring throughput and comparing to a peak level. The billing systems contain what the peak throughputs are for the service plans and the data usage systems allow for the determination of the weights throughout a period of time in order to compute the weighted average calculations. The subscriber's user profiles may also contain similar information as billing records and may also be utilized by the system 100, apparatus 200, and method to provide the functionality as provided in the present disclosure. Based on the functionality provided according to the present disclosure, the system 100, apparatus 200, and methods may provide for improved user experiences with service providers, improved service provider accountability, improved savings, among other benefits.

Figure 2:
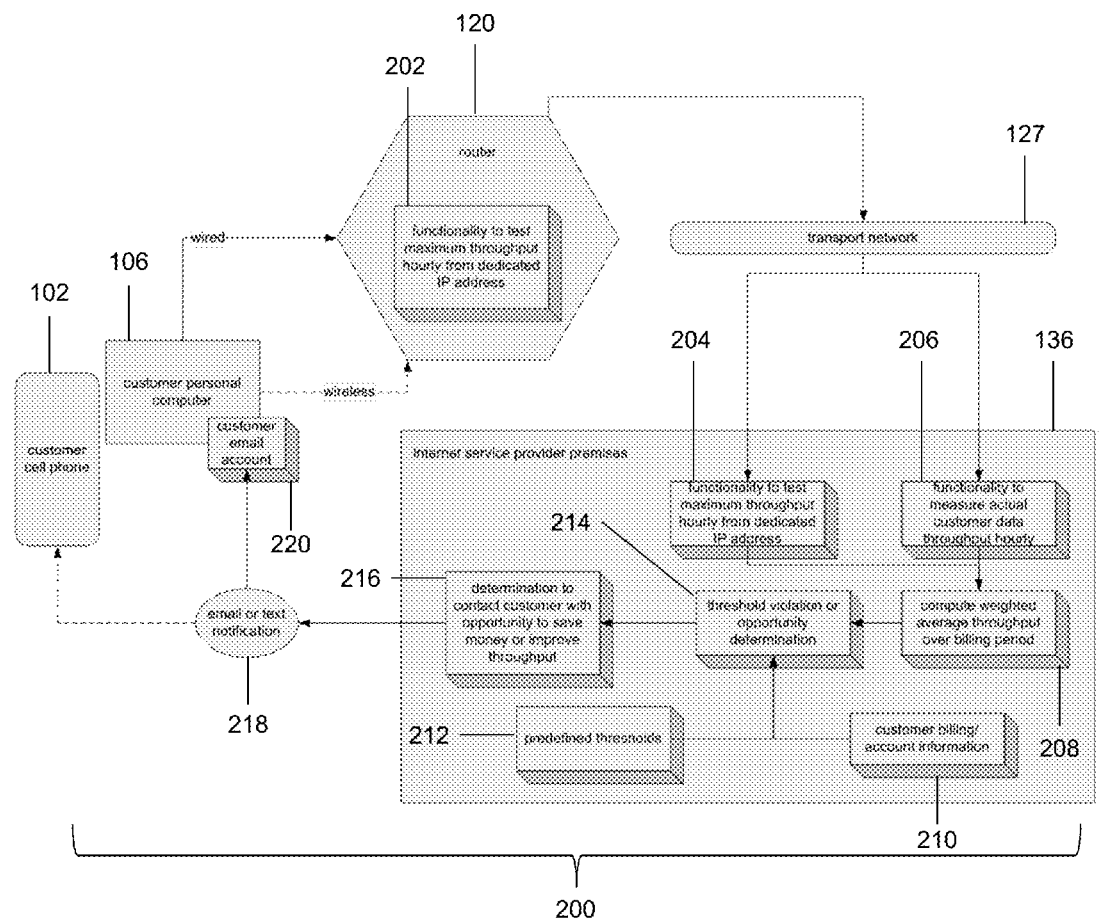
FIG. 2 is a schematic diagram illustrating additional components and functionality of the system and apparatus of FIG. 1.

As shown in FIGS. 1-2, a system 100 and apparatus 200 for automatic reconciliation of data throughput is disclosed. In certain embodiments, the system 100 and apparatus 200 may be utilized for automatic reconciliation of data throughput billed by an internet service provider, such as an internet service provider associated with internet service provider premises 136. The system 100 may be configured to support, but is not limited to supporting, internet connectivity services, telephone services, customer support services, IPTV services, digital video recorder services, cloud computing services, content delivery services, IP Multimedia Subsystem (IMS) services, satellite services, fiber services, voice-over-internet protocol services (VoIP), voice-over-long-term-evolution (VoLTE) services, LTE services, software as a service (SaaS) applications, gaming applications and services, social media applications and services, financial services, throughput determination services, software services, operations management applications and services, productivity applications and services, mobile applications and services, and any other computing applications and services. The system may include a first user 101 that may utilize a first user device 102 to access data, access content, access services, make telephone calls, and/or to perform a variety of other functions. As an example, the first user 101 may utilize first user device 102 to request content from one or more web servers, upload content to one or more entities, connect to a call with the second user 110 using the third user device 111, perform any other operations, or any combination thereof.

In certain embodiments, the first user 101 may be a subscriber of a service provider, and the first user device 102 may be equipped for mobile communication. For example, the first user 101 may be a subscriber of an internet service plan provided by an internet service provider controlling the internet service provider premises 136. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a set-top-box, a tablet device, a phablet, a server, a mobile device, a smartphone, a smart watch, or any other type of computing device. Illustratively, the first user device 102 is shown as a smartphone device in FIGS. 1-2. In certain embodiments, the first user device 102 may communicate with any of the devices in the system 100, or any combination thereof, by utilizing infrared radiation, radio frequency technologies, Bluetooth connectivity, ZigBee, Z-Wave, any type of wireless protocol, radio technologies, or any combination thereof. The first user device 102 may communicate with the devices and components of the system 100 via network connections provided for under internet service plan.

In addition to the first user device 102, the first user 101 may also utilize a second user device 106. Much like the first user device 102, the second user device 106 may be equipped for mobile communication and may be able to connect to the various devices and components of the system 100 via one or more network connections provided under the internet service plan subscribed to by the first user 101. The second user device 106 may include a memory 107 that includes instructions, and a processor 108 that executes the instructions from the memory 107 to perform the various operations that are performed by the second user device 106. In certain embodiments, the processor 108 may be hardware, software, or a combination thereof. In certain embodiments, the second user device 106 may be a computer, a laptop, a set-top-box, a tablet device, a phablet, a server, a mobile device, a smartphone, a smart watch, or any other type of computing device. Illustratively, the second user device 106 is shown as a computer in FIGS. 1-2. In certain embodiments, the second user device 106 may communicate with any of the devices in the system 100, or any combination thereof, by utilizing infrared radiation, radio frequency technologies, Bluetooth connectivity, ZigBee, Z-Wave, any type of wireless protocol, radio technologies, or any combination thereof.

The system 100 may also include a second user 110 that may utilize a third user device 111 to also access data, access content, access services, make telephone calls, and/or to perform a variety of other functions. In certain embodiments, the second user 110 may be a subscriber of the service provider and the third user device 111 may be equipped for mobile communication. For example, the third user device 111 may be utilized by the second user 110 to communicate with the first user 101 via a call connected to the first user device 102. The second user 110 may download and/or upload data and information by utilizing the third user device 111. The third user device 111 may include a memory 112 that includes instructions, and a processor 113 that executes the instructions from the memory 112 to perform the various operations that are performed by the third user device 111. In certain embodiments, the processor 113 may be hardware, software, or a combination thereof. Similar to the first user device 102 and the second user device 106, in certain embodiments, the third user device 111 may be a computer, a laptop, a tablet device, a phablet, a server, a mobile device, a smartphone, a smart watch, or any other type of computing device. Illustratively, the third user device 111 is shown as a smartphone device in FIG. 1. In certain embodiments, the third user device 111 may communicate with any of the devices in the system 100, or any combination thereof, by utilizing infrared radiation, radio frequency technologies, Bluetooth connectivity, ZigBee, Z-Wave, any type of wireless protocol, radio technologies, or any combination thereof.

In certain embodiments, the first, second, and third user devices 102, 106, 111 may have any number of software applications and/or application services stored and/or accessible thereon. For example, the first, second, and third user devices 102, 106, 111 may include throughput measuring applications, cloud-based applications, VoIP applications, other types of phone-based applications, product-ordering applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with the any device in the system 100, any network in the system 100, or any combination thereof. In certain embodiments, the first and second user devices 102, 111 may include associated telephone numbers, device identities, or any other identifiers to uniquely identify the first, second, and third user devices 102, 106 111.

In certain embodiments, the first, second, and third user devices 102, 111 may have corresponding device profiles. In certain embodiments, each of the devices, applications, and systems in the system 100 may have its own corresponding device profile. For example, the testing application 125, the testing application 137, the router 120, and the database 155 may have their own device, system, or application profiles. Information included in a device, system, or application profile may include, but is not limited to, information specifically corresponding to the first, second, and third user devices 102, 106, 111, information identifying the types of devices that the first, second, and third user devices 102, 106, 111 are, information relating to how the first user 101 utilizes the first user device 102 and second user device 106, information relating to how the second user 110 utilizes the third user device 111, information identifying what type of services and information the first user 101 and second user 110 are subscribed to and authorized to access, information indicating each type of component included in the first, second, and third user devices 102, 106, 111, information identifying the processing power, storage capacity, download capabilities, and upload capabilities associated with the first, second, and third user devices 102, 106, 111, any other information associated with the first, second, and third user devices 102, 106, 111, or any combination thereof. The device profiles may be made accessible to any device, network, or a combination thereof, in the system 100.

In addition to device profiles, the system 100 may also include user profiles. A user profile may be a profile corresponding to the first user 101, the second user 110, or any other user. For example, the first user's 101 profile may include information, such as, but not limited to, a name of the first user 101, a gender of the first user 101, the age of the first user 101, an ethnicity of the first user 101, a race of the first user 101, an occupation of the first user 101, languages spoken by the first user 101, any demographic information associated with the first user 101, information identifying the first user device 102 and the second user device 106, information identifying the types of services subscribed to by the first user 101, information identifying a location of the first user 101, information identifying the types of applications that the first user 101 utilizes, information identifying the amount of throughput subscribed to by the first user 101, any other information, or any combination thereof. The user profiles may also include an image of the first user 101, recorded speech of the first user 101, any other content or information, or any combination thereof. The user profiles may also indicate other users that are authorized by the first user 101 to use the services and products subscribed to by the first user 101, other users that are authorized to make changes to an account of the first user 101 with a business, verbal or text password required to access the account of the first user 101, other information, or a combination thereof. In certain embodiments, the user profiles may include user accounts for the users of the system 100. The user profiles may be stored directly on the first user device 102, the second user device 106, the third user device 111, the database 155, on any other device in the system 100, or on any combination thereof. Additionally, the user profiles may be accessible by any device in the system 100, any network in the system 100, or a combination thereof.

The system 100 may include a router 120, which may include any of the functionality of a traditional router. The router 120 may include a memory 121 that includes instructions, and a processor 122 that executes the instructions from the memory 121 to perform the various operations that are performed by the router 120. In certain embodiments, the processor 122 may be hardware, software, or a combination thereof. In certain embodiments, the router 120 may be any type of device that may be in proximity with the first user device 102, the second user device 106, the third user device 111, or any combination thereof. The router 120 may be in proximity with the first, second, and/or third user devices 102, 106, 111 by being in the same location as the first, second, and/or third user devices 102, 106, 111, by being in communication range of the first, second, and/or third user devices 102, 106, 111, by being in a vicinity of the first, second, and/or third user devices 102, 106, 111, or any combination thereof. In certain embodiments, the router 120 may be located as close to the first and second user devices 102, 106 as possible to determine throughput associated with network connections of the first and second user devices 102, 106. In certain embodiments, the router 120 may be configured to communicate with the first, second, and/or third user devices 102, 106, 111, any other device, system, and/or application in the system 100, or a combination thereof.

The router 120 may include a testing application 125 installed thereon, which may include functionality to test throughput for one or more network connections and/or communications links of a service provider, such as those utilized by the first and/or second users 101, 110 under their respective internet service plans. In certain embodiments, the testing application 125 may be configured to determine that maximum throughput for the network connections and/or communications links during a selected period of time. The router 120 may be located in proximity to the first, second, and/or third user devices 102, 106, 111 so that the testing application 125 may obtain throughput measurements for the network connections as if they were obtained from the first, second, and/or third user devices 102, 106, 111 directly. In certain embodiments, the testing application 125 may be installed and executed from the first, second, and/or third user devices 102, 106, 111 directly without installing the testing application 125 on the router 120. In certain embodiments, the testing application 125 may be configured to include a dedicated internet protocol address that is not throttled by the service provider associated with the first user 101 and/or second user 110.

In order to measure the throughput for the network connections and/or communications links, the testing application 125 may transmit packet data of varying file sizes to a remote server of the service provider (e.g. servers 140, 145), which measures the transmission time and determines the maximum throughput associated with sending the packet data of varying file sizes. The network connections and/or communications links utilized to transmit the packet data may be the same network connections and/or communications links that would be used by the first, second, and/or third user devices 102, 106, 111 under the internet service plan. This process also happens in the opposite direction and a testing application 137 installed on the internet service provider premises 136 may send files of varying sizes to the testing application 125, which measures the transmission time and determines the maximum throughput associated with sending packet data of varying sizes as well. Notably, the testing application 137 may include any of the features and functionality of the testing application 125, but may be located at the internet service provider premises 136 instead of at the router 120 or the first, second, or third user devices 102, 106, 111. Also, the testing application 137 may also not be throttled by the service provider as well.

By not throttling the testing application 125 and/or the testing application 137, the testing applications 125, 127 may obtain the maximum throughput measurements associated with sending or receiving files over the network connections and/or communications links that the first and/or second users 101 utilize under their respective internet service plans. The maximum throughput measurements measured by the testing application 125 may be transmitted by the router 120 to the testing application 137, to the remote servers of the internet service provider premises 136, and/or to other devices in the internet service provider premises 136 for further processing. The maximum throughput measurements measured by the testing application 137, may be provided to the testing application 125 or to any appropriate device, application, and/or system. In certain embodiments, the throughput measurements may be measured periodically according to a preset time interval, measured randomly, or a combination thereof. The testing applications 125, 137 may collect and analyze throughput statistics and measurements and compare them to the throughput subscribed to by the first and/or second users 101, 110 in their respective internet service plans. In certain embodiments, the testing applications 125, 137 may compare the measurement throughput statistics and measurements to information (e.g. how much throughput the first and second users 101, 110 paid for under their respective service plans) in billing records associated with the internet service plans of the first and second users 101, 110. The comparisons may be utilized to determine what throughput the first and second users 101, 110 are paying for in comparison to the maximum throughput that is actually possible for the network connections and communications links that the first and second users 101, 110 actually use. For example, if the measured maximum throughput for a particular communications link is 25 Mbps and the first user 101 is paying for 30 Mbps, then the first user 101 is paying for more throughput than they are actually able to receive.

In certain embodiments, the testing applications 125, 137, the servers 140, 145, and/or other devices of the system 100 may be configured to separately measure the total payload from the first and second user's 101, 110 customer accounts for all internet protocol addresses transmitting or receiving data and information under their respective internet service plans, except for the internet protocol address reserved for the testing application 125. In certain embodiments, the payload tonnage may be accumulate hourly or at another designated time interval. All of the payload information may be transmitted to the servers 140, 145 and/or to other appropriate devices in the internet service provider premises 136. The payload information may indicate the actual total usage of the service provider's network connections by the first and second users 101, 110. In certain embodiments, the servers 140, 145 may determine over a timeline of interest what percentage of the first and/or second user's 101, 110 total usage occurs per hour of the day or during another desired timeframe. The system 100, such as via the servers 140, 145, may proceed to determine a weighted average of throughput, which may be the measured throughput per hour (or other desired time period) weighted by the historical percentage of customer data usage per hour (or other desired time period). In certain embodiments, the measured throughput per hour may be the maximum throughput measurements obtained from the testing applications 125, 137.

The system 100, such as via the servers 140, 145, may compare the weighted average of throughput value to the throughput subscribed to by the first and/or second users 101, 110. In certain embodiments, the weighted average of throughput value may be compared to billing records for the first and/or second user 101, 110 to determine if the first and second users 101, 110 are able to obtain throughput within a parametric percentage of the throughput billed to the first and/or second users 101, 110 respectively. As an example, the first user 101 may pay the service provider for 20 Mbps of throughput and may use the first user device 102 seventy percent of the time during four prime time hours. During these prime time hours, the system 100 may measure 10 Mbps, and, at all other hours, the system 100 may measure 25 Mbps. In such a scenario, the weighted average of throughput=$0.70*10$ Mbps+$0.30*25$ Mbps=14.5 Mbps. If the threshold of concern is 80% of the purchased throughput in this example, then a trigger for performing a corrective action may occur if the weighted average of throughput is at or beneath 16 Mbps. In the example above, 14.5 Mbps is below 80% of the 20 Mbps paid for. Since the weighted average of throughput is at or beneath 16 Mbps, the system 100 may transmit a notification to the first user device 102 or second user device 106 informing the first user 101 that he or she is paying for a throughput option that is not being achieved and that the first user 101 may consider backing down from their current internet service plan to a lower throughput internet service plan. In certain embodiments, if the weighted average of throughput is at or below the threshold of concern or a predefined threshold, the system 100 may automatically reduce the first user's 101 internet service plan to a lower throughput internet service plan and also automatically reduce the fees for the new plan accordingly. In this example, the system 100 prevents overbilling of the first user 101 for throughput the first user 101 is not achieving.

As another example, the second user 110 may have 75% of his usage during off peak hours when the system 100 measures 30 Mbps throughput, and, at all other times, measures 10 Mbps. The second user's 110 weighted average of throughput may be $0.75*30+0.25*10$=25 Mbps. The second user 110 may be paying for 10 Mbps throughput in his internet service plan with the service provider. In this case, the system 100 may generated a notification to be transmitted to the third user device 111 that notifies the second user 110 that he is able to achieve much higher throughput with a higher data throughput internet service plan. In this example, if the second user 110 chooses the higher data throughput internet service plan, the service provider may have an opportunity to increase revenue based on the higher priced higher data throughput service plan. In certain embodiments, even if the weighted average of throughput value is sufficiently close to the billed throughput, but the billed throughput is never achieved, the system 100 may trigger an action such as transmitting a notification to the user that the user is within x % of the billed throughput, but not actually getting it. In certain embodiments, for the purposes of these calculations, the system 100 does not measure the throughput of customer data usage because that data may already be throttled by the service provider. In such embodiments, the key is to have independent throughput measurement on its own internet protocol address that is specifically not throttled by the service provider. This independent throughput measurement may be performed by the testing application 125 and/or the testing application 137. This allows the system 100 to make a maximum throughput determination even when the user's data throughput is already being throttled either directly by the service provider and/or by congestion on the networks supporting the internet connectivity for the users.

The system 100 may include a transport network 127, which may be configured to link the router 120, the first user device 102, the second user device 106, and/or the third user device 111 with the internet service provider premises 136. The transport network 127 may be utilized by the first user device 102 and/or second user device 106 to connect with other devices within or outside communications network 135, such as third user device 111 of the second user 110. Transport network 127 may be configured to transmit, generate, and receive any information and data traversing the system 100. In certain embodiments, the transport network 127 may include any number of servers, databases, or other componentry, and may be controlled by the service provider. In certain embodiments, the transport network 127 may include and be connected to a radio access network, a cloud-computing network, an IMS network, a VoIP network, a VoLTE network, an LTE network, a wireless network, an Ethernet network, a fiber network, a satellite network, a broadband network, a cellular network, a private network, a cable network, the Internet, an internet protocol network, a multiprotocol label switching (MPLS) network, a content distribution network, an internet protocol television network, any network, or any combination thereof. In certain embodiments, the transport network 127 may be part of a single autonomous system that is located in a particular geographic region, or be part of multiple autonomous systems that span several geographic regions. In certain embodiments, the transport network 127 may be utilized by the testing application 125 to transmit throughput measurements to the internet service provider premises 136 and/or the testing application 137. In certain embodiments, the transport network 127 may be utilized by the testing application 137 to transmit throughput measurements to the router 120 and/or the testing application 125. Additionally, the transport network 127 may be utilized to relay notifications and messages generated by the system 100.

The system 100 may also include a communications network 135. The communications network 135 of the system 100 may be configured to link each of the devices in the system 100 to one another, and may be configured to support the functionality and services provided by the service provider. For example, the communications network 135 may be utilized by the first user device 102 to connect with other devices within or outside communications network 135, such as third user device 111 of the second user 110. Additionally, the communications network 135 may be configured to transmit, generate, and receive any information and data traversing the system 100. In certain embodiments, the communications network 135 may include any number of servers, databases, or other componentry, and may be controlled by a service provider. In certain embodiments, the communications network 135 may be subscribed to by the first and second users 101, 110. The communications network 135 may also include and be connected to a radio access network, a cloud-computing network, an IMS network, a VoIP network, a VoLTE network, an LTE network, a wireless network, an Ethernet network, a fiber network, a satellite network, a broadband network, a cellular network, a private network, a cable network, the Internet, an internet protocol network, a MPLS network, a content distribution network, an internet protocol television network, any network, or any combination thereof. Illustratively, servers 140, 145 are shown as being included within communications network 135. In certain embodiments, the communications network 135 may be part of a single autonomous system that is located in a particular geographic region, or be part of multiple autonomous systems that span several geographic regions.

In certain embodiments, the communications network 135 may be configured to deliver data, media content, and service using an internet protocol suite and by utilizing packet switching. The communications network 135 may provide the ability to stream data and content requested by the first and second users 101, 110, provide any data generated by any other device of the system 100, or any combination thereof. In certain embodiments, the communications network 135 may include any of the components and functionality found in traditional communication networks. In certain embodiments, the communications network 135 may include hardware components that include any of the functional features of a radio access network. The communications network 135 may be configured to provide interactive voice response services, cellular services, any type of services, or any combination thereof. Additionally, the communications network 135 may include any of the functionality of a base station utilized in mobile communication networks. For example, the communications network 135 may include any number of antennae, transceivers, digital signal processors, control electronics, GPS receivers, electrical power sources, radio equipment, and electronics equipment to create a cell for the communications network 135. The communications network 135 may be configured to communicate with and receive content and data streams from any other network or system, or any combination thereof.

The internet service provider premises 136 may be a set of routers, computing devices, gateways, and other devices under the control of the service provider that may be utilized to support the functionality and services provided by the system 100 and to the first and second users 101, 110. In certain embodiments, the internet service provider premises 136 may include the servers 140, 145, the communications network 135, the database 155, the server 160, the testing application 137, any other appropriate device, application, and/or system, or any combination thereof. The internet service provider premises 136 may be configured to communicate with any device, system, and/or program of the system 100 or otherwise. The internet service provider premises 136 may be configured to process the throughput measurements and other measurements made by the testing applications 125, 137, measure the first and/or second user's 101, 110 actual data usage under their internet service plans, determine if the weighted average of throughput value differs from subscribed to throughput by a greater than a threshold amount, set the threshold amounts, determine if notifications are to be sent to the first and/or second users 101, 110, generate the notifications to be sent to the first and/or second users 101, 110, receive selections from the first and second users 101, 110 indicating a desire to reduce or increase throughput, perform any desired operation of the system 100, or any combination thereof.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, the transport network 127, any network, any device in the system 100, or any combination thereof. In certain embodiments, the servers 140, 145 may reside within the internet service provider premises 136.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. Additionally, the database 155, in certain embodiments, may serve as a data and content source for stored data and content that may be accessed by the communication network 135 so that the communication network 135 may obtain the data and content for the first and second users 101, 110 in an efficient and effective manner. In certain embodiments, the database 155 may serve as a central repository for data and content and information requested by the first and second users 101, 110. Furthermore, the database 155 may include a processor and memory or be connected to a processor and memory to perform the various operation associated with the database 155.

In certain embodiments, the database 155 may be connected to servers 140, 145, 160, first user device 102, second user device 106, the third user device 111, the testing applications 125, 137, the router 120, any other device or system, or any combination thereof. The database 155 may also store information and metadata obtained from the system 100, store media content, store metadata and other information associated with the first and second users 101, 110, store user profiles associated with the first and second users 101, 110, user accounts of the first user 101, store device profiles associated with the first user device 102, the second user device 106, the third user device 111, and/or any other device in the system 100, store location information, store communications traversing the system 100, store user preferences, such as preferences relating to amount of throughput desired and types of products and services that the user likes, store information associated with any device or signal in the system 100, store information relating to patterns of usage relating to the first, second, and third user devices 102, 106, 111, store service subscription information associated with services subscribed to by the first user 101 and/or second user 110, store information utilized for identifying communications network 135, store any type of demographic information associated with the first and second users 101, 110, store throughput measurements made by the testing applications 125, 137, store billing records for the first and second users 101, 110, store predefined thresholds for triggering corrective actions by the system 100, store email account information for the first and second users 101, 110, store actual throughput usage measurements associated with the first and/or second users' 101, 110 transmission or reception of data using the network connections of the service provider, store weighted average of throughput calculations, store the algorithm for calculating the weighted average of throughput calculations, store throughput values for the throughput paid for by the first and second users 101, 110 (may be included in the billing records), store any information traversing the system 100, or any combination thereof. Furthermore, the database 155 may be configured to process queries sent to it by any device in the system 100.

Operatively and referring to FIGS. 1-2, the system 100 may provide for automatic reconciliation of data throughput as shown in the following exemplary scenario. In the example scenario, the first user 101 may utilize first user device 102 and second user device 106, and both devices may access the Internet or other network resources by utilizing communication links and/or network connections provided by a service provider that controls internet service provider premises 136. For example, the first user 101 may utilize the first user device 102 and/or second user device 106 to access web-based video content, internet protocol television services, web pages, make internet-based telephone calls, or any other desired operation. The first user 101 may subscribe to an internet service plan with the service provider that the first user 101 purchased that indicates the amount of throughput that the first user 101 paid for. The amount of throughput paid for may be indicated in the first user 101 user profile and/or the first user's 101 billing records that the service provider may maintain on behalf of the first user 101.

In order to determine if the first user 101 is actually achieving throughput that corresponds with the first user's 101 subscribed-to throughput, the system 100 may include installing a testing application 125 that includes a throughput measurement capability/function 202 at a router 120 as close as possible to the first user's 101 devices. The testing application 125 may have a dedicated internet protocol address that is not subject to throttling by the service provider or otherwise. In certain embodiments, the testing application 125 may be installed directly on the first user's 101 devices. In order to begin the testing process, the testing application 125 may transmit packet data including files, such as files of varying sizes, to a remote server (e.g. server 140) of the service provider. The packet data may be transmitted over network connections and/or communications links that the first user 101 may typically utilize. As the packet data is being received, the remote server, along with the resources at the internet service provider premises 136 or elsewhere, may determine a maximum throughput of a network connection of the first user 101 and/or communications links utilized by the first user 101 under the internet service plan. The maximum throughput may be determined based on the transmission time associated with receiving the packet data.

Another testing application 137 installed at the remote server at the internet service provider premises 136 may also include a throughput measurement capability/function 204 and may also be utilized as well. The testing application 137 may send packet data of varying sizes to the testing application 125, which may also measure the maximum throughput of the network connections and/or communications links utilized by the first user 101. The system 100 may then proceed to determine, for all internet protocol addresses associated with the first user 101 that utilize the network connections and/or communications links, a total payload of data transmitted and/or received using the network connections and/or communications links during a selected period of time. The determination may be performed by utilizing a function 206 that measures the actual user data throughput hourly. This determination may exclude the payload of data associated with the internet protocol address dedicated to the testing application 125. The total payload of data may be accumulated hourly at another desired time interval. Once the total payload of data is determined, the system 100 may proceed to determine, over a timeline of interest, the percentage of total usage of the network connections and/or communications links that occurs per hour during the selected period of time.

The system 100 may then proceed, at 208, to compute the weighted average of throughput for the network connections and/or communications links utilized by the first user 101 based on the maximum throughput per hour for the network connections and/or communications links weighted by the percentage of the total usage of the network connections and/or communications links that occurs per hour. For example, if the first user's 101 total usage over 24 hours consistently indicates 22 hours of no usage and two hours of equal usage, then those two hours may have 50% weighting each and the weighted average of throughput would be: weighted_ave_TP=hour1%*Throughput_hour1+hour2%*Throughput_hour2. The system 100 may then compare the weighted average of throughput value to billing records and/or user profiles 210 of the first user 101 to determine if they are within a parametric percentage of the billed throughput. The system 100 may also check to see if the measured throughput ever gets up to the billed throughput. As another example, the first user 101 may subscribe to 20 Mbps throughput through the internet service plan and may use the first user device 102 70% during four prime time hours. During these prime time hours, the system 100 may determine maximum throughput to be 10 Mbps and the maximum throughput at other hours to be 25 Mbps. In this example the weighted average of throughput would be equal to 0.7*10+0.3*25=14.5 Mbps. If the threshold of concern 212 to trigger a corrective action is set at 80% of the subscribed-to throughput, then the system's 100 trigger would occur at 16 Mbps. In this case, the system 100 detects, at 214, that the weighted average of throughput is below the trigger point and may trigger the determination of a corrective action to be performed.

At 216, the system 100 may determine whether to contact the first user 101 with an opportunity to save money and/or to improve throughput. The corrective action, for example, may be for the system 100 to transmit a notification, such as an email or text notification 218, to the first user device 102 that indicates that the first user 101 is paying for a throughput option that is not being achieved and that they have the option to reduce their subscribed-to throughput and/or have their fees reduced. A similar notification may be sent to an email account 220 of the first user that is accessible on second user device 106. In certain embodiments, the system 100 may automatically reduce the subscribed-to throughput and/or automatically reduce the fees required from the first user 101 under the internet service plan. In certain embodiments, the first user 101 may be given the option to modify their internet service plan, such as via first user device 102. Using another example, the first user 101 may have 75% of their usage during peak hours when the system measures maximum throughput to be 30 Mbps and at all other times the system 100 measures maximum throughput to be 10 Mbps. In this example, the weighted average of throughput=0.75*30+0.25*10=25 Mbps. In this example the first user 101 may be paying for only 10 Mbps of throughput under the internet service plan. In this case, the corrective action may be that the system 100 transmits a notification to the first user 101 indicating that they are capable of achieving much higher throughput and that a higher throughput plan may be purchased to take advantage of it. In certain embodiments, the corrective action may include automatically providing free services to the first user 101 for a selected period of time. Other corrective actions may be performed as well as described in the present disclosure and otherwise. Notably, the system 100 may incorporate any of the functionality and features described for the method 300 or as otherwise described herein.

Notably, as shown in FIG. 1, the system 100 may perform any of the operative functions disclosed herein by utilizing the processing capabilities of server 160, the storage capacity of the database 155 or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving, at a remote server and from an application installed on a router in proximity to a device of a user, first packet data including first files of varying sizes; determining, at the remote server, a maximum throughput of a network connection of the user based on a transmission time associated with receiving the first packet data; determining, for all internet protocol addresses associated with the user that utilize the network connection, a total payload of data transmitted or received during a selected period of time, the total payload indicating a total usage of the network connection by the user; determining a percentage of the total usage of the network connection that occurs per hour of the selected period of time; computing a weighted average throughput for the network connection of the user based on the maximum throughput per hour for the network connection weighted by the percentage of the total usage of the network connection that occurs per hour; performing corrective actions if the weighted average of throughput differs from the amount of throughput subscribed to by the user or billed to the user by greater than a threshold amount; and performing any other suitable operations conducted in the system 100 or otherwise. In one embodiment, multiple servers 160 may be utilized to process the functions of the system 100. The server 160 and other devices in the system 100 may utilize the database 155 for storing data about the devices in the system 100 or any other information that is associated with the system 100. In one embodiment, multiple databases 155 may be utilized to store data in the system 100.

Although FIGS. 1-2 illustrate specific example configurations of the various components of the system 100, the system 100 may include any configuration of the components, which may include using a greater or lesser number of the components. For example, the system 100 is illustratively shown as including a first user device 102, a second user device 106, a third user device 111, a router 120, a testing application 125, a transport network 127, a communications network 135, an internet service provider premises 136, a testing application 137, a server 140, a server 145, a database 155, and a server 160. However, the system 100 may include multiple first user devices 102, multiple second user devices 106, multiple third user devices 111, multiple routers 120, multiple testing applications 125, multiple transport networks 127, multiple communications networks 135, multiple internet service provider premises 136, multiple testing applications 137, multiple servers 140, multiple servers 145, multiple databases 155, and multiple servers 160, or any number of any of the other components in the system 100. In certain embodiments, the apparatus 200 may include the internet service provider premises 136, the testing application 137, the database 155, the server 140, the server 145, the communications network 135, any other device, system, and/or application, or any combination thereof. Furthermore, in certain embodiments, substantial portions of the functionality and operations of the system 100 may be performed by other networks and systems that may be connected to system 100.

Figure 3:
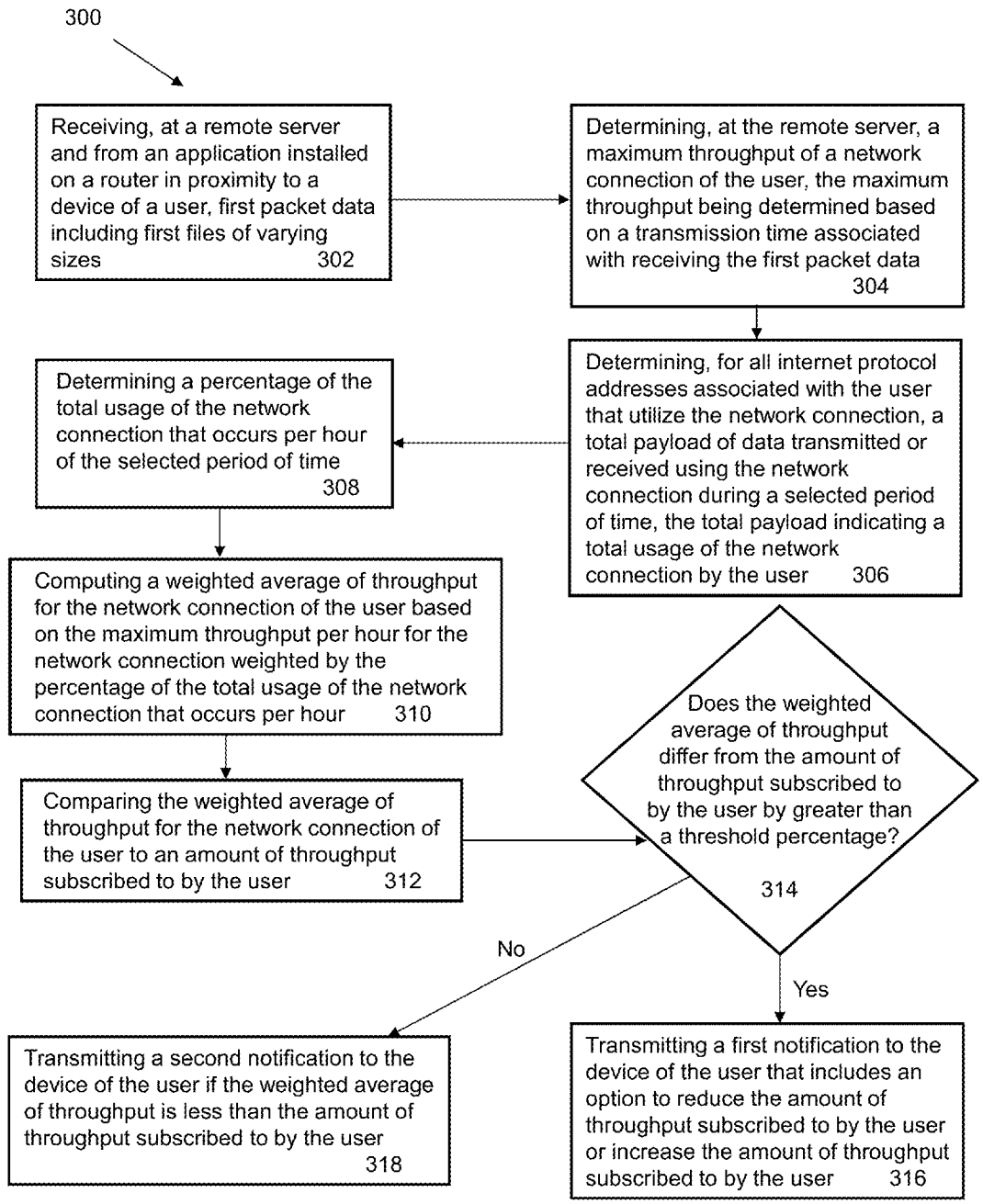
FIG. 3 is a flow diagram illustrating a sample method for automatic reconciliation of data throughput according to an embodiment of the present disclosure.

As shown in FIG. 3, an exemplary method 300 for automatic reconciliation of data throughput is schematically illustrated, and may include, at step 302, receiving, at a remote server, first packet data including first files of varying sizes. The first packet data may be received from an application (e.g. testing application 125) installed on a router 120 in proximity to one or more devices (e.g. first and/or second user devices 102, 106) of the first user 101. The application installed on the router 120 may have a dedicated internet protocol address that is not subject to throttling by the service provider of first user 101. The opposite process described above may also occur as well. For example, at step 302, the method 300 may include receiving, at a testing application and from the remote servers, second packet data including second files of varying sizes. In certain embodiments, the receiving and/or transmitting of the first packet data and/or second packet data may be performed by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device.

At step 304, the method 300 may include determining, at the remote server, a maximum throughput of a network connection and/or communications link utilized by the user. The network connection and/or communications link may be the network connection and/or communications link that the first user 101 utilizes under the internet service plan that the first user 101 has with the service provider. The maximum throughput may be determined based on transmission times associated with receiving the first packet data and/or the second packet data. In certain embodiments, the determining may be performed and facilitated by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device. At step 306, the method 300 may include determining, for all internet protocol addresses associated with the user that utilize the network connection and/or communications link, a total payload of data transmitted and/or received using the network connection and/or communications link during a selected period of time. In certain embodiments, the total payload measurement may exclude the payload associated with the internet protocol address of the application installed on the router 120. The total payload may indicate a total usage of the network connection and/or communications link by the first user 101. In certain embodiments, the determining may be performed and facilitated by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device.

At step 308, the method 300 may include determining a percentage of the total usage of the network connection and/or communications link that occurs per hour of the selected time period. In certain embodiments, the determining may be performed and/or facilitated by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device. At step 310, the method 300 may include computing a weighted average of throughput for the network connection and/or communications link based on the maximum throughput per hour for the network connection and/or communications link weighted by the percentage of the total usage of the network connection and/or communications link that occurs per hour. In certain embodiments, the computing may be performed and/or facilitated by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device.

At step 312, the method 300 may include comparing the weighted average of throughput for the network connection and/or communications link of the user to an amount of throughput subscribed to by the user from the service provider. For example, the comparing may be performed by comparing the weighted average of throughput value to information identifying the subscribed-to throughput that is contained in billing records for the first user 101 and/or a user profile of the first user 101. In certain embodiments, the comparing may be performed and/or facilitated by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device. At step 314, the method 300 may include determining if the weighted average of throughput value differs from the amount of throughput subscribed to by the first user 101 by greater than (or equal to) a threshold amount, such as a threshold percentage. In certain embodiments, the determining may be performed and/or facilitated by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device.

If the weighted average of throughput differs from the amount of throughput subscribed to by the first user 101 by greater than (or equal to) the threshold amount, the method 300 may include, at step 316, transmitting a first notification to one or more devices of the first user 101 (e.g. first or second user devices 102, 111) indicating an option to reduce the amount of throughput subscribed to by the first user 101. In certain embodiments, the first notification may provide an option to the first user 101 to increase the amount of throughput subscribed to by the first user 101. Such a scenario may arise if the amount of throughput subscribed is less than the weighted average of throughput calculated by the system 100 and/or less than the throughput available on the network connection and/or communications link. In certain embodiments, the transmission and/or generation of the first notification may be performed and/or facilitated by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device.

If, however, the weighted average of throughput does not differ from the amount of throughput subscribed to by the first user 101 by greater than (or equal to) the threshold amount, but the weighted average of throughput is nevertheless less than the amount of throughput subscribed to by the first user 101, the method 300 may include, at step 318, transmitting a second notification to the one or more devices of the first user 101. For example, the second notification may indicate that the first user 101 is within x % of the billed throughput, but not actually receiving it. In such a scenario, the first user 101 may be given the option to reduce or increase their subscribed-to throughput. In certain embodiments, the second notification may be generated and/or transmitting by utilizing the router 120, the testing application 125, the testing application 137, the internet service provider premises 136, the server 140, the server 145, the server 160, the communications network 135, the transport network 127, any combination thereof, or by utilizing any other appropriate program, network, system, or device. If the weighted average of throughput does not differ from the amount of throughput subscribed to by the first user 101 by the threshold amount and is not less than the throughput subscribed to by the first user 101, the method 300 may not send a notification and may instead revert back to step 302. The method 300 may be repeated as necessary to ensure that the first user 101 is achieving throughput that corresponds with the throughput that he or she is subscribing to from the service provider. Notably, the method 300 may further incorporate any of the functionality and features as described for system 100, the apparatus 200, or as otherwise described herein.

Notably, the system 100, the apparatus 200, and methods disclosed herein may include additional functionality and features. For example, in certain embodiments, the system 100, the apparatus 200, and methods may include allowing the first user 101 and/or second user 110 to set the threshold amount required to trigger the corrective actions and/or notifications sent by the service provider. In certain embodiments, the threshold amount to trigger the corrective actions and/or notifications may be set by the service provider itself. In certain embodiments, when the testing applications 125, 137 send the packet data of varying file sizes, the types of files may be varied as needed. For example, the packet data may include media content files, dynamic content, data, information, image files, video files, audio files, software files, any type of file, or any combination thereof. In certain embodiments, the time periods for measuring the throughput and/or total usage of the network connections and/or communications links in the present disclosure may be varied as necessary. In certain embodiments, the functionality provided by the system 100, apparatus 200, and the method may be performed by utilizing a special-purpose processor specifically configured to perform the functions according to the present disclosure.

Figure 4:
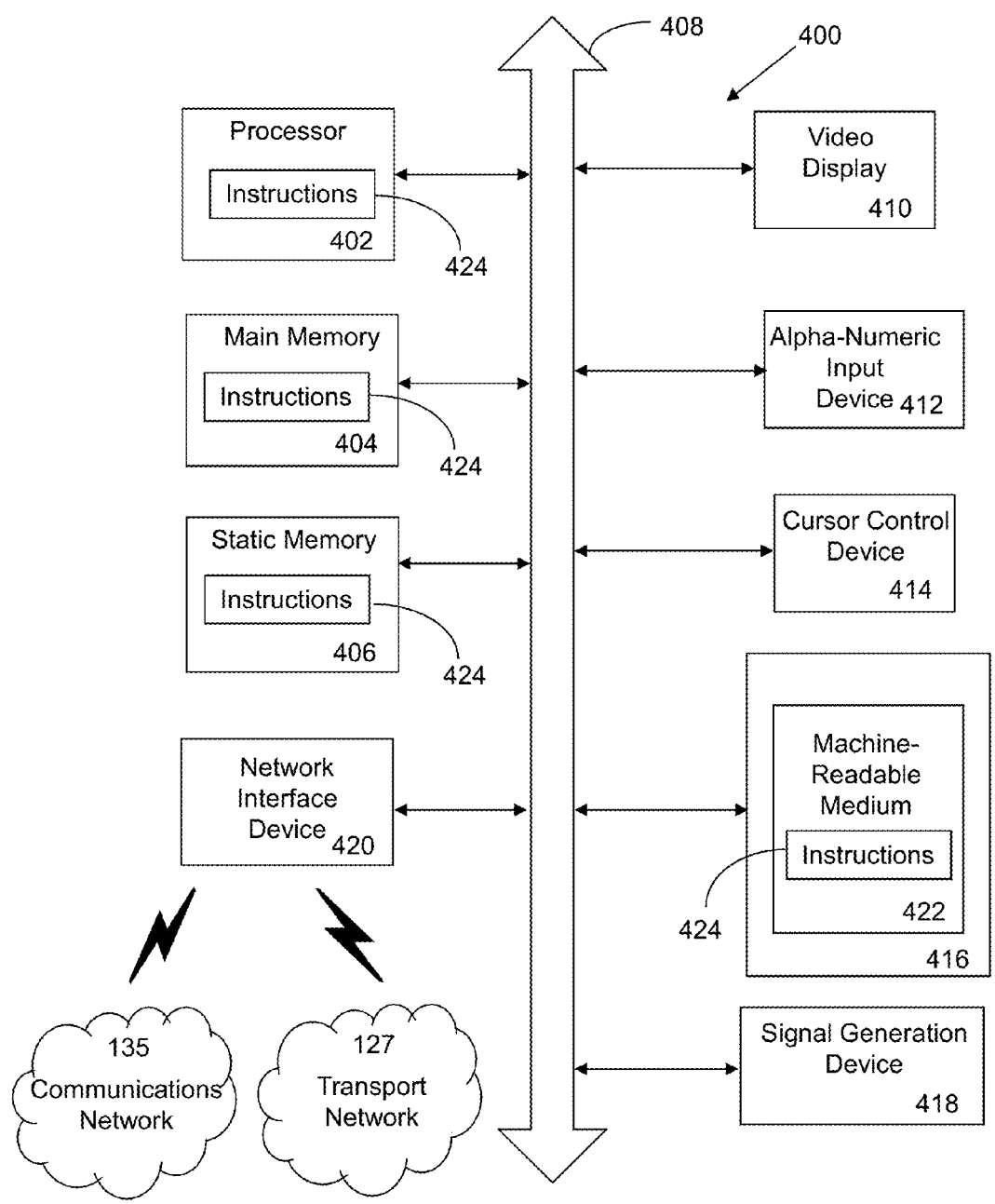
FIG. 4 is a schematic diagram of a machine in the form of a computer system within which a set of instructions, when executed, may cause the machine to perform any one or more of the methodologies or operations of the systems, apparatuses, and methods for automatic reconciliation of data throughput.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, transport network 127, another network, or a combination thereof) to and assist with operations performed by other machines and systems, such as, but not limited to, the first user device 102, the second user device 106, the third user device 111, the router 120, the testing application 125, the internet service provider premises 136, the testing application 137, the server 140, the server 145, the database 155, the server 160, the apparatus 200, any other device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410, which may be, but is not limited to, a liquid crystal display (LCD), a flat panel, a solid state display, or a cathode ray tube (CRT). The computer system 400 may include an input device 412, such as, but not limited to, a keyboard, a cursor control device 414, such as, but not limited to, a mouse, a disk drive unit 416, a signal generation device 418, such as, but not limited to, a speaker or remote control, and a network interface device 420.

The disk drive unit 416 may include a machine-readable medium 422 on which is stored one or more sets of instructions 424, such as, but not limited to, software embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 422 containing instructions 424 so that a device connected to the communications network 135, the transport network 127, another network, or a combination thereof, can send or receive voice, video or data, and to communicate over the communications network 135, the transport network 127, another network, or a combination thereof, using the instructions. The instructions 424 may further be transmitted or received over the communications network 135, the transport network 127, another network, or a combination thereof, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
receiving, at a remote server and from an application installed on a router in proximity to a device of a user, first packet data including first files of varying file sizes;
determining, at the remote server, a maximum throughput of a network connection of the user, wherein the maximum throughput is determined based on a first transmission time associated with receiving the first packet data;
determining, for all internet protocol addresses associated with the user that utilize the network connection, a total payload of data transmitted or received using the network connection during a selected period of time, wherein the total payload of data indicates a total usage of the network connection by the user;
determining a percentage of the total usage of the network connection that occurs per hour of the selected period of time;
computing a weighted average of throughput for the network connection of the user, wherein the weighted average of throughput is computed based on the maximum throughput per hour for the network connection weighted by the percentage of the total usage of the network connection that occurs per hour;
comparing the weighted average of throughput for the network connection of the user to an amount of throughput subscribed to by the user; and
generating a first notification if the weighted average of throughput differs from the amount of throughput subscribed to by the user by greater than a threshold percentage.

2. The system of claim 1, wherein the operations further comprise transmitting, from the remote server and to the application installed on the router in proximity to the device of the user, second packet data including second files of varying file sizes.

3. The system of claim 2, wherein the operations further comprise determining, at the application, the maximum throughput of the network connection of the user based on a second transmission time associated with the second packet data.

4. The system of claim 1, wherein the operations further comprise transmitting the first notification to the device of the user, wherein the notification provides an option for the user to reduce the amount of throughput subscribed to by the user.

5. The system of claim 1, wherein the operations further comprise transmitting the first notification to the device of the user, wherein the notification provides an option for the user to increase the amount of throughput subscribed to by the user.

6. The system of claim 1, wherein the operations further comprise not throttling the application installed on the router in proximity to the device of the user.

7. The system of claim 1, wherein the operations further comprise comparing the weighted average of throughput for the network connection of the user to the amount of throughput subscribed to by the user after accessing a user profile of the user.

8. The system of claim 1, wherein the operations further comprise generating a second notification if the weighted average of throughput does not differ from the amount of throughput subscribed to by the user by greater than the threshold percentage, but is less than the amount of throughput subscribed to by the user.

9. The system of claim 8, wherein the operations further comprise transmitting the second notification to the device of the user.

10. The system of claim 1, wherein the operations further comprise automatically reducing the amount of throughput subscribed to by the user if the weighted average of throughput differs from the amount of throughput subscribed to by the user by greater than the threshold percentage.

11. The system of claim 1, wherein the operations further comprise providing the application with a dedicated internet protocol address.

12. A method, comprising:
receiving, at a remote server and from an application installed on a router in proximity to a device of a user, first packet data including first files of varying file sizes;
determining, at the remote server, a maximum throughput of a network connection of the user, wherein the maximum throughput is determined based on a first transmission time associated with receiving the first packet data;
determining, for all internet protocol addresses associated with the user that utilize the network connection, a total payload of data transmitted or received using the network connection during a selected period of time, wherein the total payload of data indicates a total usage of the network connection by the user;
determining, by utilizing instructions from a memory that are executed by a processor, a percentage of the total usage of the network connection that occurs per hour of the selected period of time;
computing a weighted average of throughput for the network connection of the user, wherein the weighted average of throughput is computed based on the maximum throughput per hour for the network connection weighted by the percentage of the total usage of the network connection that occurs per hour;
comparing the weighted average of throughput for the network connection of the user to an amount of throughput subscribed to by the user; and
transmitting a first notification if the weighted average of throughput differs from the amount of throughput subscribed to by the user by greater than a threshold percentage.

13. The method of claim 12, further comprising transmitting, from the remote server and to the application installed on the router in proximity to the device of the user, second packet data including second files of varying file sizes.

14. The method of claim 13, further comprising determining, at the application, the maximum throughput of the network connection of the user based on a second transmission time associated with the second packet data.

15. The method of claim 12, further comprising not throttling the application installed on the router in proximity to the device of the user.

16. The method of claim 12, further comprising generating a second notification if the weighted average of throughput does not differ from the amount of throughput subscribed to by the user by greater than the threshold percentage, but is less than the amount of throughput subscribed to by the user.

17. The method of claim 16, further comprising transmitting the second notification to the device of the user.

18. The method of claim 12, further comprising providing the application with a dedicated internet protocol address.

19. The method of claim 12, further comprising automatically reducing the amount of throughput subscribed to by the user if the weighted average of throughput differs from the amount of throughput subscribed to by the user by greater than the threshold percentage.

20. A computer-readable device comprising instructions, which, when loaded and executed by a processor, cause the processor to perform operations, the operations comprising:
receiving, at a remote server and from an application installed on a router in proximity to a device of a user, first packet data including first files of varying file sizes;
determining, at the remote server, a maximum throughput of a network connection of the user, wherein the maximum throughput is determined based on a first transmission time associated with receiving the first packet data;
determining, for all internet protocol addresses associated with the user that utilize the network connection, a total payload of data transmitted or received using the network connection during a selected period of time, wherein the total payload of data indicates a total usage of the network connection by the user;
determining a percentage of the total usage of the network connection that occurs per hour of the selected period of time;
computing a weighted average of throughput for the network connection of the user, wherein the weighted average of throughput is computed based on the maximum throughput per hour for the network connection weighted by the percentage of the total usage of the network connection that occurs per hour;
comparing the weighted average of throughput for the network connection of the user to an amount of throughput subscribed to by the user; and generating a first notification if the weighted average of throughput differs from the amount of throughput subscribed to by the user by greater than a threshold percentage.

* * * * *